United States Patent
Chen

(10) Patent No.: US 11,927,354 B2
(45) Date of Patent: Mar. 12, 2024

(54) METHOD AND SYSTEM FOR FLAMMABLE GAS DETECTION

(71) Applicant: Carrier Corporation, Palm Beach Gardens, FL (US)

(72) Inventor: Lei Chen, South Windsor, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 574 days.

(21) Appl. No.: 17/057,275

(22) PCT Filed: Jul. 2, 2019

(86) PCT No.: PCT/US2019/040300
§ 371 (c)(1),
(2) Date: Nov. 20, 2020

(87) PCT Pub. No.: WO2020/010082
PCT Pub. Date: Jan. 9, 2020

(65) Prior Publication Data
US 2021/0364180 A1    Nov. 25, 2021

Related U.S. Application Data

(60) Provisional application No. 62/694,718, filed on Jul. 6, 2018.

(51) Int. Cl.
*F24F 11/36* (2018.01)
*G01M 3/04* (2006.01)

(52) U.S. Cl.
CPC .............. *F24F 11/36* (2018.01); *G01M 3/04* (2013.01)

(58) Field of Classification Search
CPC .................................. F24F 11/36; G01M 3/04
See application file for complete search history.

(56) References Cited

U.S. PATENT DOCUMENTS

| 5,889,199 A | 3/1999 | Wong et al. |
| 7,022,993 B1 | 4/2006 | Williams, II et al. |
| (Continued) | | |

FOREIGN PATENT DOCUMENTS

| CN | 202904826 U | 4/2013 |
| CN | 203311599 U | 11/2013 |
| (Continued) | | |

OTHER PUBLICATIONS

"MRLDS-250 Infrared Refrigerant Gas Detector"; Emerson Electric Co.; Retrieved Online from https://climate.emerson.com/en-us/products/controls-monitoring-systems/facility-controls-electronics/refrigerant-leak-detectors; 2018; 2 Pages.
(Continued)

*Primary Examiner* — Lionel Nouketcha
(74) *Attorney, Agent, or Firm* — CANTOR COLBURN LLP

(57) ABSTRACT

A method and system for monitoring for leakage of flammable compounds is disclosed. A first parameter is measured indicative of the presence flammable compounds in a space around a potential leak source of a flammable compound, and a presence of the flammable compound is prospectively determined based on measurement of the first parameter. Additionally, a second parameter is measured in the space around the potential leak source. The prospective presence of the flammable compound determined by measurement of the first parameter is characterized, in conjunction with the measurement of the second parameter, as an actual presence of the flammable compound or as a false alarm.

19 Claims, 5 Drawing Sheets

(56) References Cited

U.S. PATENT DOCUMENTS

| | | | |
|---|---|---|---|
| 7,318,335 B2 | 1/2008 | Olesen et al. | |
| 9,482,592 B2 | 11/2016 | Huseynove et al. | |
| 9,495,860 B2 | 11/2016 | Lett | |
| 2005/0086952 A1* | 4/2005 | Nonaka | F25D 11/022 62/129 |
| 2015/0028209 A1 | 1/2015 | Harju et al. | |
| 2016/0178229 A1* | 6/2016 | Chen | F24F 11/30 62/126 |
| 2016/0245566 A1* | 8/2016 | Hiraki | F24F 11/77 |
| 2017/0045474 A1* | 2/2017 | Buchholz | G01N 27/4163 |
| 2017/0089800 A1 | 3/2017 | Huseynov et al. | |
| 2017/0198936 A1* | 7/2017 | Yamaguchi | F24F 11/74 |
| 2017/0234761 A1 | 8/2017 | Augusto | |
| 2017/0370605 A1 | 12/2017 | Makino et al. | |
| 2018/0211733 A1* | 7/2018 | Richter | G21G 1/02 |

FOREIGN PATENT DOCUMENTS

| | | |
|---|---|---|
| CN | 204314015 U | 5/2015 |
| CN | 107436016 A | 12/2017 |
| EP | 3584521 A1 | 12/2019 |
| WO | 2010007448 A1 | 1/2010 |

OTHER PUBLICATIONS

"Refrigerant Leak Detectors"; AC Tech; 2017; 2 Pages.
International Search Report Issued in International Application No. PCT/US2019/040300 dated Nov. 7, 2019; 5 Pages.
Written Opinion Issued in International Application No. PCT/US2019/040300 dated Nov. 7, 2019; 5 Pages.
European Examination Report for Application No. 19752580.1; dated Mar. 2, 2022; 6 Pages.

* cited by examiner

METHOD AND SYSTEM FOR FLAMMABLE GAS DETECTION

CROSS REFERENCE TO RELATED APPLICATIONS

This application is a National Stage application of PCT/US2019/040300, filed Jul. 2, 2019, which claims the benefit of U.S. Provisional Application No. 62/694,718, filed Jul. 6, 2018, both of which are incorporated by reference in their entirety herein.

BACKGROUND

Exemplary embodiments pertain to the art of gas monitoring, and more specifically to detection of flammable gases from sources such as heating & cooling and refrigerant systems.

Gas sensors have been used in various applications such as process monitoring and control and safety monitoring. As the compounds can also be flammable or explosive, gas detection sensors have also been used for leak detection where such compounds are used or manufactured. Various types of sensors have been used or proposed, including but not limited to metal oxide semiconductor (MOS) sensors, non-dispersive infrared detector (NDIR) sensors, pellistor (pelletized resistor) sensors, ultrasonic sensors, high-temperature solid electrolytes that are permeable to oxygen ions, and electrochemical cells.

BRIEF DESCRIPTION

A method for monitoring for leakage of flammable compounds is disclosed. According to the method, a first parameter is measured indicative of the presence flammable compounds in a space around a potential leak source of a flammable compound, and a presence of the flammable compound is prospectively determined based on measurement of the first parameter. Additionally, according to the method, a second parameter is measured in the space around the potential leak source. The prospective presence of the flammable compound determined by measurement of the first parameter is characterized, in conjunction with the measurement of the second parameter, as an actual presence of the flammable compound or as a false alarm.

A monitoring system for detecting leakage of flammable compounds is also disclosed. The monitoring system includes a first sensor configured to measure a first parameter indicative of the presence flammable compounds in a space around a potential leak source of a flammable compound, and a second sensor configured to measure a second parameter in the space around the potential leak source. The monitoring system also includes a controller configured to characterize, in conjunction with the measurement of the second parameter, the prospective presence of the flammable compound determined by measurement of the first parameter as an actual presence of the flammable compound or as a false alarm.

An air conditioning or heat pump system is also disclosed. The air conditioning or heat pump system includes a first heat exchanger comprising a conditioned air flow path on a first side of the heat exchanger, and a refrigerant flow path comprising a flammable refrigerant on a second side of the heat exchanger in thermal communication with the first side. An enclosed fluid flow path comprising the flammable refrigerant connects the refrigerant flow path of the first heat exchanger with a second heat exchanger in thermal communication with an external heat source or heat sink. The system also includes a first sensor is configured to measure a first parameter indicative of the presence flammable compounds in a space around a potential leak source of a flammable compound, and a second sensor configured to measure a second parameter in the space around the potential leak source. The system also includes a controller configured to characterize, in conjunction with the measurement of the second parameter, the prospective presence of the flammable compound determined by measurement of the first parameter as an actual presence of the flammable compound or as a false alarm.

In any one or combination of the foregoing embodiments, the refrigerant has a class 2 or class 2L or class 3 flammability rating according to ASHRAE 34-2016.

In any one or combination of the foregoing embodiments, the sensors are disposed in a conduit on the conditioned air flow path comprising an inlet and an outlet, and the first and second sensors are disposed in the conduit with the second sensor downstream from the first sensor with respect to a direction of flow from the inlet to the outlet.

In any one or combination of the foregoing embodiments, measurements of the first parameter are indicative of the presence and concentration of a flammable compound.

In any one or combination of the foregoing embodiments, measurements of the first parameter are provided by a sensor selected from an ultrasound sensor, an infrared absorbance sensors, an electrochemical sensor, or a MOS sensor.

In any one or combination of the foregoing embodiments, the second parameter is a physical property of gas in the space around the potential leak source.

In any one or combination of the foregoing embodiments, the second parameter is selected from a temperature, humidity, pressure, or gas flow.

In any one or combination of the foregoing embodiments, the second parameter includes temperature.

In any one or combination of the foregoing embodiments, the second parameter includes humidity.

In any one or combination of the foregoing embodiments, the second parameter includes gas flow.

In any one or combination of the foregoing embodiments, of a third parameter or a plurality of additional parameters are measured, and the prospective presence of the flammable compound determined by measurement of the first parameter is characterized as an actual presence of the flammable compound or as a false alarm, in conjunction with the measurement of the second and third or plurality of additional parameters.

In any one or combination of the foregoing embodiments, the third or plurality of additional parameters are is selected from temperature, humidity level, pressure, or gas flow.

In any one or combination of the foregoing embodiments, the space around the potential leak source is an enclosed space.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
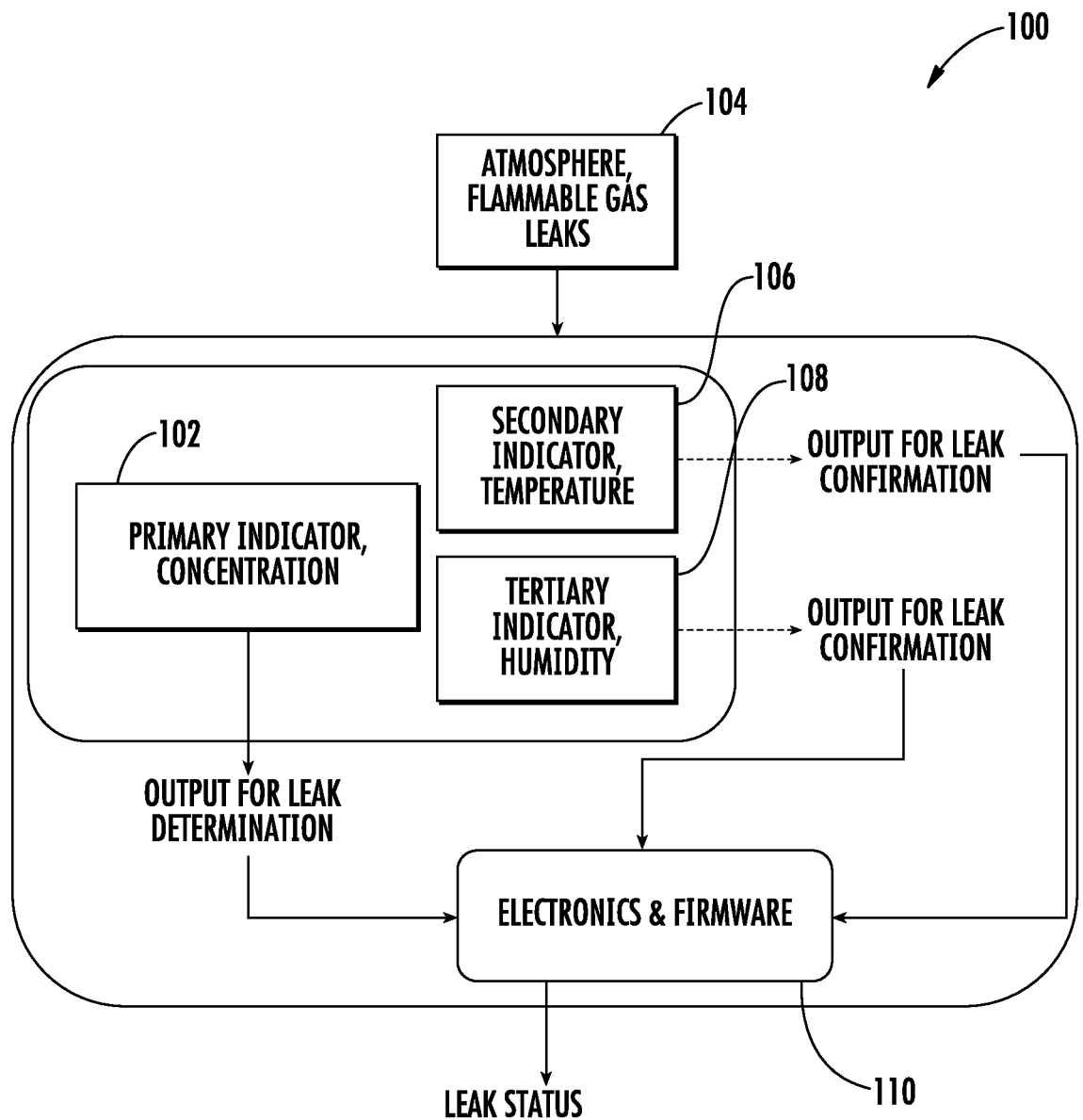
FIG. 1 is a schematic depiction of an example embodiment of a flammable gas sensor with secondary and tertiary indicators and related firmware.

A detailed description of one or more embodiments of the disclosed apparatus and method are presented herein by way of exemplification and not limitation with reference to the Figures.

The above types of sensors have been used with varying degrees of success in the industrial or laboratory settings where they have been employed. However, many such sensors have limitations that can impact their effectiveness in demanding new and existing applications. For example, pellistor sensors are prone to false alarms due to cross-sensitivity. NDIR sensors can provide good selectivity, but are expensive for high volume applications. Electrochemical sensors rely on redox reactions involving tested gas components at electrodes separated by an electrolyte that produce or affect electrical current in a circuit connecting the electrodes. However, solid state electrochemical sensors can be prone to nuisance alarms due to poor selectivity. Additionally, solid state electrochemical sensors testing for combustible hydrocarbons may utilize solid electrolytes formed from ceramics such as perovskite, which can require high temperatures (typically in excess of 500° C.) that render them impractical for many applications that require long lifetime. Some electrochemical sensors that operate at lower temperatures (e.g., carbon monoxide sensors, hydrogen sulfide sensors) are incapable of electrochemically oxidizing relatively stable organic compounds that nevertheless be flammable or mildly flammable, such as some hydrofluoro carbon refrigerants.

MOS sensors rely on interaction between gas test components such as hydrogen sulfide or hydrocarbons with adsorbed oxygen on the metal oxide semiconductor surface. In the absence of the gas test components, the metal oxide semiconductor adsorbs atmospheric oxygen at the surface, and this adsorbed oxygen captures free electrons from the metal oxide semiconductor material, resulting in a measurable level of base resistance of the semiconductor at a relatively high level. Upon exposure to reducing or combustible gas test components such as hydrocarbons or hydrofluorocarbons (HFCs), the gas test component interacts with the adsorbed oxygen, causing it to release free electrons back to the semiconductor material, resulting in a measurable decrease in resistance that can be correlated with a measured level of test gas component. Though MOS sensors are relatively inexpensive, the lack of selectivity can potentially cause false alarms.

Ultrasonic sensors can detect for the presence of gas components based on the dependence of speed of sound on gas compositions, but can be susceptible to false alarms because environment conditions such as temperature and moisture content can also affect the output as do gas compositions. More importantly, the speed-of-sound based detection can be relatively non-selective, hence can potentially lead to false alarms.

In the HVAC/R industry, more environmentally friendly refrigerants are being developed and used to replace refrigerants with high global warming potentials (GWP) such as R134A and R410A. Many of the low GWP refrigerants are flammable (A3 refrigerants such as R290 i.e. propane) or mildly flammable (A2L refrigerants such as R32, R1234ze etc.). In refrigerant leak detection applications involving testing for compounds foreign to ambient air, false alarms can be a problem, potentially interrupting system operations. Various leak detection technologies have been proposed to address potential fire hazards from flammable refrigerants in interior building spaces; however, there continues to be a need to provide scalable cost-effective detection technologies capable of discerning refrigerant leaks.

As mentioned above, the systems and methods described herein include first and second sensors and optional additional sensors. The sensors can be disposed as separate sensor assemblies or can be combined into a unitary sensor assembly with multiple sensor components. One of the sensors, or a constituent component in a sensor, measures a parameter indicative of a presence of flammable gas. Such a sensor or a sensing mechanism can include, but is not limited to, conductance measurement e.g., metal oxide sensors or speed of sound measurement, e.g. ultrasonic sensors. The architecture of the core elements of a detection system 100 with multiple indicators is illustrated schematically in FIG. 1. As shown in FIG. 1, the system 100 includes a first sensing element 102 for monitoring a primary condition parameter or parameters of a sample from the surrounding atmosphere indicative of the presence of flammable compounds in a space 104 around a potential leak source of a flammable compound. In some embodiments, the first sensing element 102 can measure a primary parameter that is also indicative of a concentration of flammable compounds or indicative of a change in concentration of flammable compounds. In some embodiments, the first sensing element 102 for measuring the primary parameter(s) can be selected from ultrasound sensors, infrared absorbance sensors, electrochemical sensors, or MOS sensors. As further shown in FIG. 1, the system 100 also includes one or more sensing elements to measure multiple 'second' parameters, which can also be referred to as secondary and tertiary, etc. parameters (in this case a second sensing element 106 and an optional third sensing element 108), and which operates on a different sensing mechanism from that of the primary parameter. Secondary or tertiary parameters can include any of the above primary parameters that can directly or indirectly measure gas phase composition, or parameters such as environmental parameters (e.g., temperature and humidity) that may not be sufficiently selective by themselves for detection of flammable compounds. In some embodiments, secondary parameters such as environmental parameters can be examined for a rate of change. The output of the system is pertinent to whether flammable gas is present, and hence that a system leak has occurred. This decision is made by a controller, e.g., an electronic control unit (ECU) 110, which can utilize software and/or firmware logic to examine the primary and auxiliary indicators physically measured by the aforementioned sensing components. Specifically, a primary parameter is based the detection of gas compositions or the change in gas compositions and the auxiliary parameters are related to environment conditions that indirectly reflect leaks, particularly those involves phase changes such as liquid refrigerant vaporization.

Figure 2:
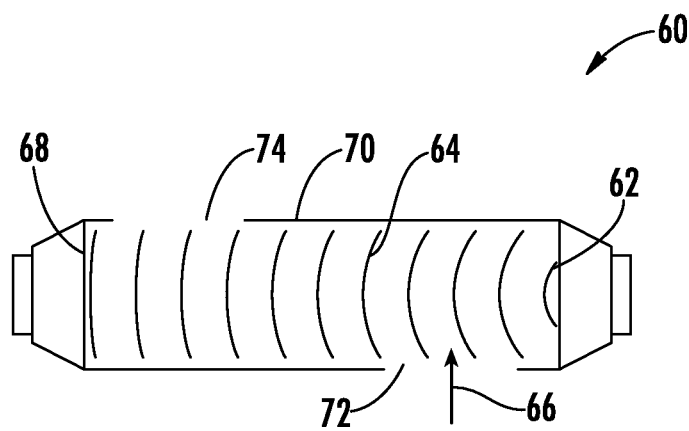
FIG. 2 is a schematic depiction of an example embodiment of an ultrasonic sensor.

An example embodiment of an ultrasonic sensor 60 is shown in FIG. 2. As shown in FIG. 2, a sound emitter/receiver 62 directs sound waves 64 through a test gas sample 66 to another emitter/receiver 68. The ultrasound transceivers can be mounted at two ends of a gas sampling conduit 70. Gas ports 72 and 74 are provided on the conduit 70 to allow gas to transport into the space for determining the change in atmosphere composition. A measured speed of sound through the gas can be calculated based on elapsed time for the signal, and compared to stored data such as a look-up table based for example on calibrated test data from samples of known flammable gas concentrations, and a determination made of flammable gas concentration in the sample. In some embodiments, a sensing element for a secondary indicator can be mounted inside the conduit 70, or exterior to the conduit 70 to detect concomitant evidence associated with a leak, or located on other system components such as on a printed circuit board assembly (PCBA).

Figure 3:
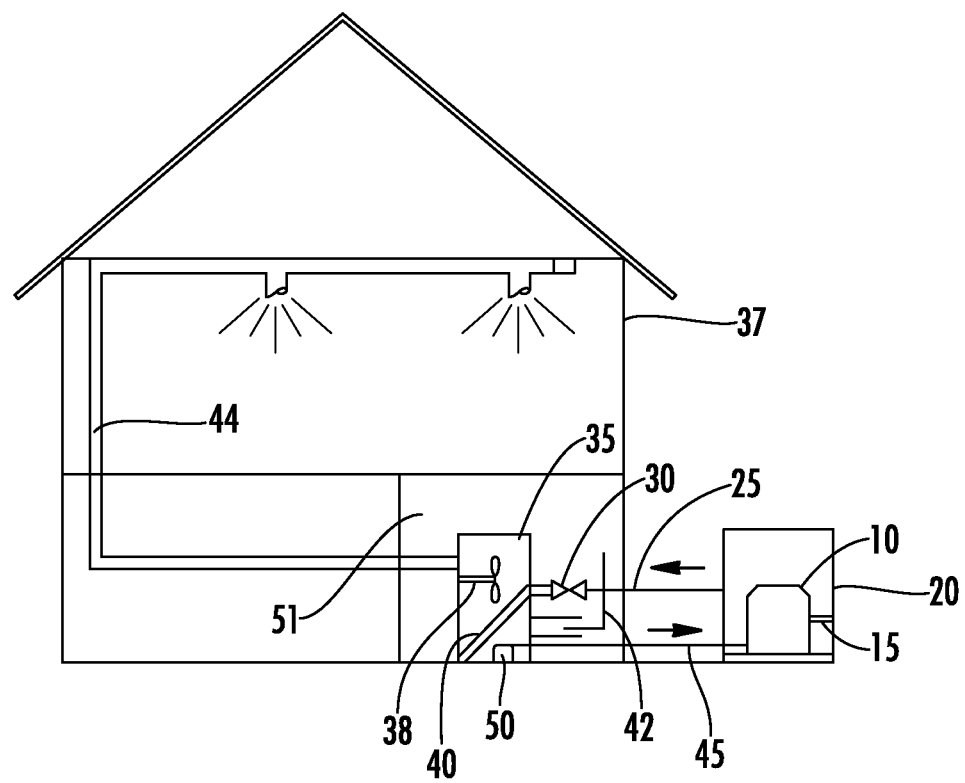
FIG. 3 is an illustration of a residential heating and cooling system.

An example embodiment of a heat transfer system with integrated sensors for monitoring for accidentally leaked heat transfer fluid is shown in FIG. 3. As shown in FIG. 3, a heat transfer system includes a compressor 10 which pressurizes the refrigerant or heat transfer fluid in its gaseous state, which both heats the fluid and provides pressure to circulate it throughout the system. The hot pressurized gaseous heat transfer fluid exiting from the compressor 10 flows through conduit 15 to heat rejection heat exchanger 20, which functions as a heat exchanger to transfer heat from the heat transfer fluid to the surrounding environment, resulting in condensation of the hot gaseous heat transfer fluid to a pressurized moderate temperature liquid. The liquid heat transfer fluid exiting from the heat rejection heat exchanger 20 (e.g., a condenser 20) flows through conduit 25 to expansion valve 30, where the pressure is reduced. The reduced pressure liquid heat transfer fluid exiting the expansion valve 30 flows to fan coil unit 35 inside the building 37, which includes fan 38 and heat absorption heat exchanger 40 (e.g., an evaporator), which functions as a heat exchanger to absorb heat from the surrounding environment and boil the heat transfer fluid. In the heat absorption heat exchanger 40, heat is absorbed by the refrigerant from a conditioned air flow path that includes a return air conduit 42 that returns air from the conditioned air space inside the building 37 and a supply air conduit 44 that supplies conditioned air to the conditioned air space inside the building 37. Gaseous heat transfer fluid exiting the heat rejection heat exchanger 40 flows through conduit 45 to the compressor 10, thus completing the heat transfer fluid loop. The heat transfer system can transfer heat from the environment surrounding to the evaporator 40 to the environment surrounding the heat rejection heat exchanger 20. The thermodynamic properties of the heat transfer fluid allow it to reach a high enough temperature when compressed so that it is greater than the environment surrounding the condenser 20, allowing heat to be transferred to the surrounding environment. The thermodynamic properties of the heat transfer fluid should also have a boiling point at its post-expansion pressure that allows the environment surrounding the heat rejection heat exchanger 20 to provide heat at a temperature to vaporize the liquid heat transfer fluid.

As further shown in FIG. 3, the heat transfer system further includes sensor pack 50, which is placed in the indoor section of the system to detect refrigerant leaks that can potential pose risks to the building and occupants. The sensor with auxiliary sensing elements besides the primary leak detection sensor is place in the unit to allow for monitoring the gas phase composition and environment conditions. As mentioned above a sensor in the sensor pack 50 can be operated to measure a primary parameter indicative of presence of a flammable gas. The other sensing element(s) in the sensor pack 50 can be operated to measure a secondary parameter(s) such as temperature, and/or humidity, and/or gas flow in the enclosed space. In the event of an actual leak of flammable vapor, physical changes to the surrounding space such as changes in temperature, and/or humidity, and/or gas flow are believed to result from the leakage and vaporization of refrigerant from the system. More specifically, leaking refrigerant in a substantial rate can cause temperature to drop, relative humidity to drop compared to normal conditions. Although these parameters may not be dispositive by themselves of a flammable gas leak, they can be used to identify false positive alarms from the primary sensor such as a MOS or ultrasonic sensor by comparing observed measurements to normal measurements or to criteria indicative of a gas leak during a time period proximate to the positive signal produced by the primary sensor.

Figure 4:
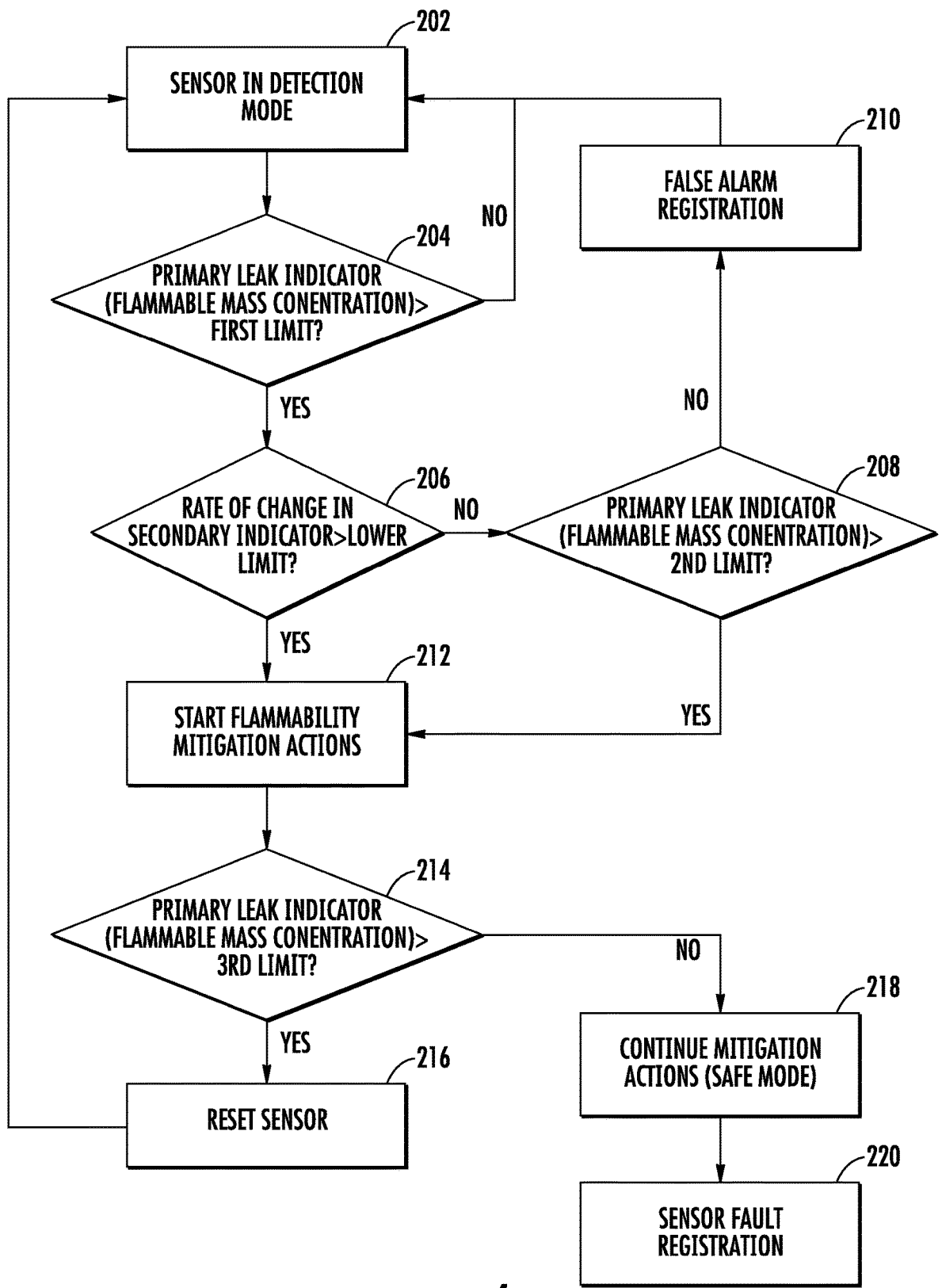
FIG. 4 and FIG. 5 are flow charts of a logic routine for ascertaining flammable refrigerant leaks based on a primary and a secondary indicator of a sensor.
Figure 5:
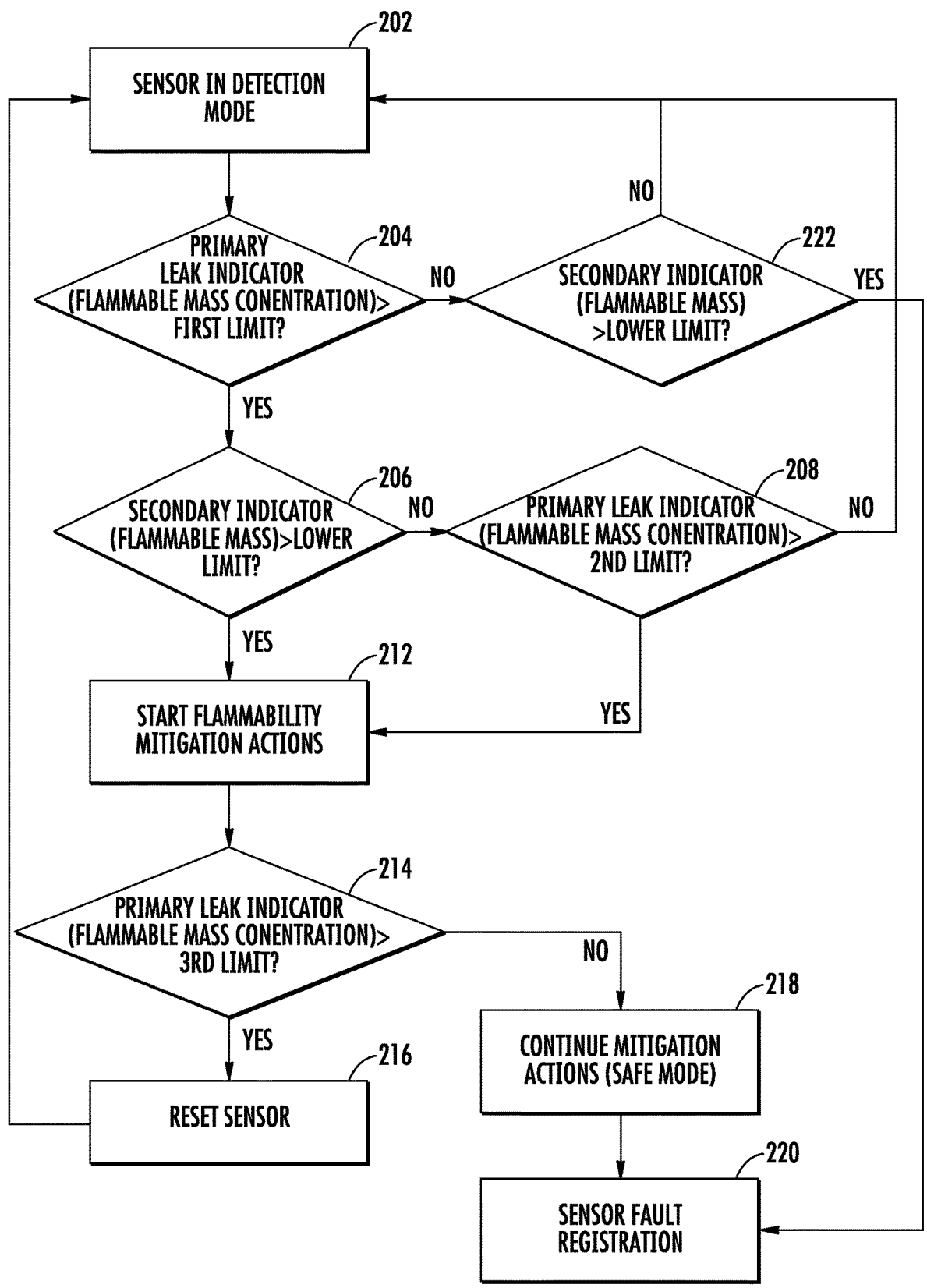

A protocol for operating a sensing device with multiple indicators to detect flammable gas leaks and to avoid false alarms is shown in FIG. 4 and FIG. 5. The determination of refrigerant leaks is enhanced by the method based on multiple indicators as illustrated in the architecture of the sensing system such as shown in FIG. 1, and related logic such as shown in FIG. 4 and FIG. 5. The embodiment of FIG. 4 shows logic based on the sensing system of FIG. 1. As shown in FIG. 4, a sensing system in detection mode 202 generates sensing output from the first sensing element 102 that is examined at decision block 204 to assess whether the primary parameter or indicator (e.g., a parameter related to gas phase composition flammable content) has exceeded a first or lower limit. If the primary parameter has exceeded the first limit, the routine proceeds to decision block 206 where output from a second sensing element 106 and/or third sensing element 108 is examined, e.g., for a rate of change. The rate of change of a secondary indicator can in some cases manifest the effects of refrigerant leaks such as sudden temperature decreases and/or humidity variations due to displacement of moisture. If the rate of change of the secondary indicator(s) does not show sufficient changes to warrant determination of leak at block 206, then the routine proceeds to block 208 where the primary indicator is examined against a second or upper limit. If the primary indicator is below this second or upper limit, then a false alarm is registered at block 210 and the system returns to sensor detection mode at block 202. If the primary indicator is decision is below the second or upper limit at block 208, or if the rate of change of the secondary indicator at block 206 confirmed the leak prospectively determined by the primary indicator at block 204, then the routine proceeds to block 212, where leak mitigation actions (e.g., introduce airflow by a fan) are taken by the system, followed by a system check at decision block 214 in which the primary indicator is measured and compared to a third limit (e.g., a safety limit). If the primary indicator is below the third limit, the mitigation actions are deemed effective and the sensor is reset at block 216 and returned to detection mode at block 202. If the primary indicator is above the third limit, then the system is put into a safe mode at block 218 in which mitigation actions are continued, and a sensor fault is registered at block 220. The leak mitigation actions are taken by the system at block 212 where primary indicator will be continually monitored until it drops below the lowest (safe) limit, namely the third limit. If the primary indicator confirms that the flammable gas concentration has decreased to a safe level, and sensor will be reset at block 216. However, if the primary indicator fails to indicate expected trend resulting from flammable gas dissipation, a sensor fault likely has occurred and a notification on sensor fault will be registered in the system at block 220. If the primary indicator does not exceed the upper (third) limit expected from more dramatic leaks, a false alarm can be registered at block 216 and sensor detection mode can continue.

In another embodiment where a secondary indicator sensed represents flammable gas concentration or presence as the primary indicator, a slightly different algorithm is implemented as shown in FIG. 5, which uses common numbering with FIG. 4 to describe like features without the need for repetition of the FIG. 4 description. As with FIG. 4, if a primary sensing output related to gas phase composition has exceeded the first lower limit in FIG. 5, a secondary indicator is compared at decision block 206 with a limit that warrants positive identification of a leak if the corresponding sensing element functions properly, followed by mitigation and other steps are engaged at block 212 or further logic at decision block 208. In contrast with FIG. 4, the routine shown in FIG. 5 utilizes the secondary indicator as a status check on the sensing element for the first indicator even when the primary indicator has not detected flammable compound(s). As shown in FIG. 5, if the primary indicator does not exceed the first limit at the decision block 204 (indicative of no leak or of normal system operation), then the secondary indicator is compared against a limit indicative of the presence of flammable compound(s) at decision block 222. The limit applied at decision block 222 can be the same as or different than the secondary indicator limit applied at decision block 206. If the secondary indicator does not exceed the limit applied at decision block 222, then the indication of no leak from the primary indicator at block 204 is confirmed, and the routine returns to the sensor detection mode at block 202.

Figure 6:
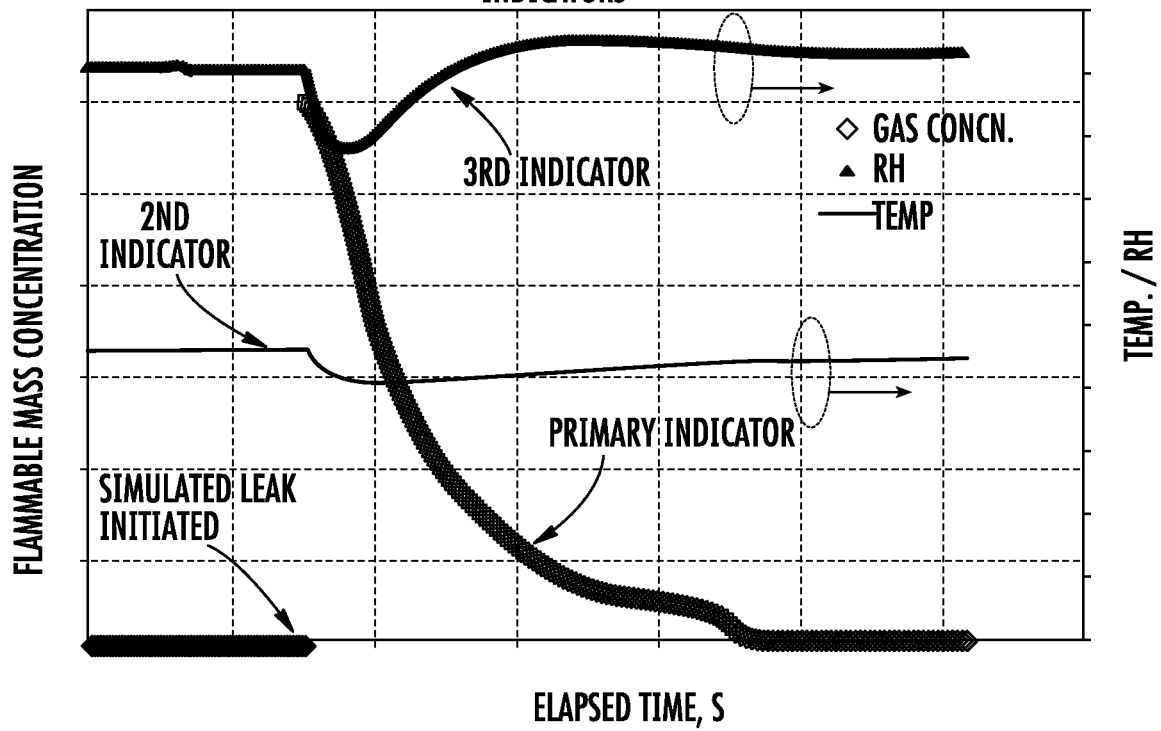
FIG. 6 is demonstration of the viability of an example embodiment of a sensor with a primary, a secondary and a tertiary indicators for monitoring leaks using the method as disclosed herein.

An example output of a sensor device incorporating a primary, a secondary, and a tertiary sensing element is shown in FIG. 6. FIG. 6 plots flammable mass concentration (primary indicator), temperature (secondary indicator), and relative humidity (tertiary indicator) versus time, under conditions of a controlled introduction of a flammable compound in a simulated leak. As shown in FIG. 6, both the secondary and the tertiary indicators exhibited correlation with the primary indicator when a sudden atmosphere composition change was detected as manifested by the primary indicator. In this experiment, a leak was positively confirmed by examining the concomitant changes of either the secondary or the tertiary indicator.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for monitoring for leakage of flammable compounds, comprising:
    measuring a first parameter indicative of the presence of flammable compounds in a space around a potential leak source of a flammable compound;
    determining a prospective presence of the flammable compound based on measurement of the first parameter;
    measuring a second parameter in the space around the potential leak source; and
    characterizing the prospective presence of the flammable compound determined by measurement of the first parameter, in conjunction with the measurement of the second parameter, as an actual presence of the flammable compound or as a false alarm;
    wherein a first sensor configured to measure the first parameter and a second sensor configured to measure the second parameter are disposed in a conduit on a conditioned air flow path comprising an inlet and an outlet, and the first sensor and the second sensor are disposed in the conduit with the second sensor downstream from the first sensor with respect to a direction of flow from the inlet to the outlet.

2. The method claim 1, wherein measurements of the first parameter are indicative of the presence and concentration of a flammable compound and the second parameter is a physical property of gas in the space around the potential leak source.

3. The method of claim 2, wherein the second parameter is selected from a temperature, humidity, pressure, or gas flow.

4. The method of claim 3, wherein the second parameter includes temperature.

5. The method of claim 3, wherein the second parameter includes humidity.

6. The method of claim 3, wherein the second parameter includes gas flow.

7. The method of claim 1, wherein measurements of the first parameter are provided by a sensor selected from an ultrasound sensor, an infrared absorbance sensor, an electrochemical sensor, or a MOS sensor.

8. The method of claim 1, further including measurement of a third parameter or a plurality of additional parameters and characterizing the prospective presence of the flammable compound determined by measurement of the first parameter as an actual presence of the flammable compound or as a false alarm, in conjunction with the measurement of the second and third or plurality of additional parameters.

9. The method of claim 8, wherein the third or plurality of additional parameters arc is selected from temperature, humidity level, pressure, or gas flow.

10. The method of claim 8, wherein the space around the potential leak source is an enclosed space.

11. A monitoring system for detecting leakage of flammable compounds, comprising:
    a first sensor configured to measure a first parameter indicative of the presence flammable compounds in a space around a potential leak source of a flammable compound;

a second sensor configured to measure a second parameter in the space around the potential leak source; and a controller configured to characterize the prospective presence of the flammable compound determined by measurement of the first parameter, in conjunction with the measurement of the second parameter, as an actual presence of the flammable compound or as a false alarm;

wherein the first sensor and the second sensor are disposed in a conduit on a conditioned air flow path comprising an inlet and an outlet, and the first sensor and the second sensor are disposed in the conduit with the second sensor downstream from the first sensor with respect to a direction of flow from the inlet to the outlet.

12. The system of claim 11, wherein measurements of the first parameter are indicative of the presence and concentration of the flammable compound and the second parameter is a physical property of gas in the space around the potential leak source.

13. The system of claim 12, wherein the second parameter is selected from a temperature, humidity, pressure, or gas flow.

14. The system of claim 11, wherein measurements of the first parameter are provided by a sensor selected from an ultrasound sensor, an infrared absorbance sensor, an electrochemical sensor, or a MOS sensor.

15. The system of claim 14, wherein the space around the potential leak source is an enclosed space.

16. The system of claim 11, further including measurement of a third parameter or a plurality of additional parameters and characterizing the prospective presence of the flammable compound determined by measurement of the first parameter as an actual presence of the flammable compound or as a false alarm, in conjunction with the measurement of the second and third or plurality of additional parameters.

17. The system of claim 16, wherein the third or plurality of additional parameters are is selected from temperature, humidity level, pressure, or gas flow.

18. An air conditioning or heat pump system, comprising
a first heat exchanger comprising a conditioned air flow path on a first side of the heat exchanger, and a refrigerant flow path comprising a flammable refrigerant on a second side of the heat exchanger in thermal communication with the first side;

an enclosed fluid flow path comprising the flammable refrigerant connecting the refrigerant flow path of the first heat exchanger with a second heat exchanger in thermal communication with an external heat source or heat sink; and a monitoring system including:
a first sensor configured to measure a first parameter indicative of the presence flammable compounds in a space around a potential leak source of a flammable compound;

a second sensor configured to measure a second parameter in the space around the potential leak source; and a controller configured to characterize the prospective presence of the flammable compound determined by measurement of the first parameter, in conjunction with the measurement of the second parameter, as an actual presence of the flammable compound or as a false alarm;

wherein the first sensor and the second sensor are disposed in a conduit on the conditioned air flow path comprising an inlet and an outlet, and the first sensor and the second sensor are disposed in the conduit with the second sensor downstream from the first sensor with respect to a direction of flow from the inlet to the outlet.

19. The system of claim 18, wherein the refrigerant has a class 2 or class 2L or class 3 flammability rating according to ASHRAE 34-2016.

* * * * *